Nov. 21, 1967    T. J. BOLLING, JR    3,353,783
CLOSED FLUID SYSTEM FOR SEALING VALVE CLOSURE ELEMENTS
Original Filed Aug. 2, 1964    4 Sheets-Sheet 1

Thomas J. Bolling, Jr.
INVENTOR.

BY Hayden & Pravel

ATTORNEYS

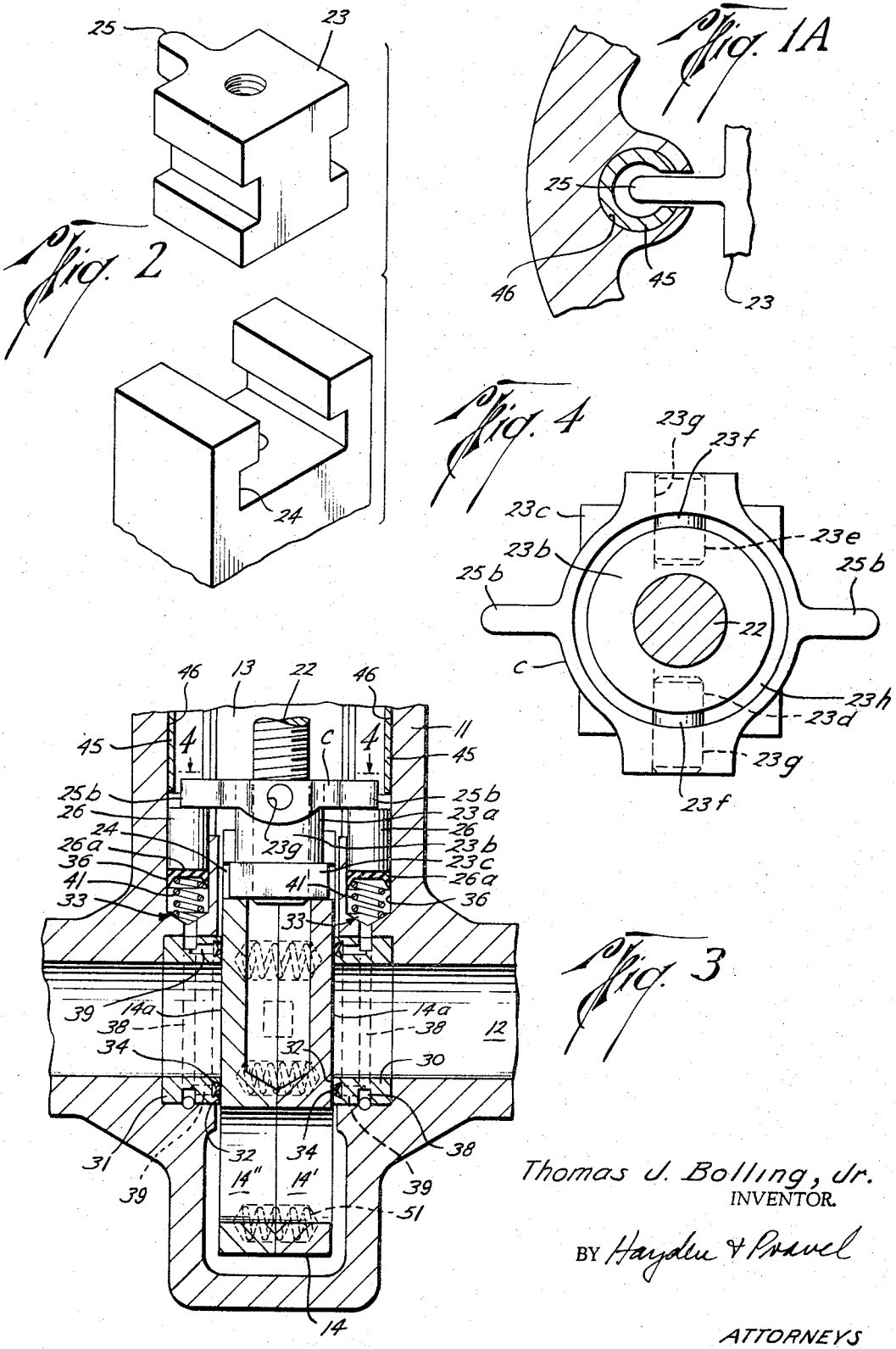

Nov. 21, 1967 T. J. BOLLING, JR 3,353,783
CLOSED FLUID SYSTEM FOR SEALING VALVE CLOSURE ELEMENTS
Original Filed Aug. 2, 1964 4 Sheets-Sheet 3
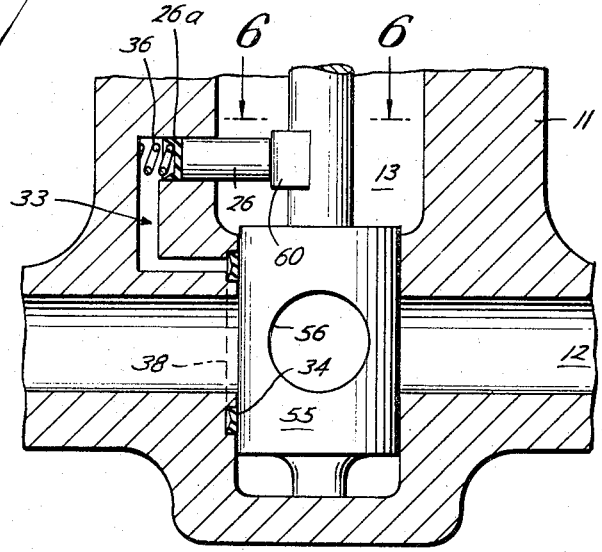
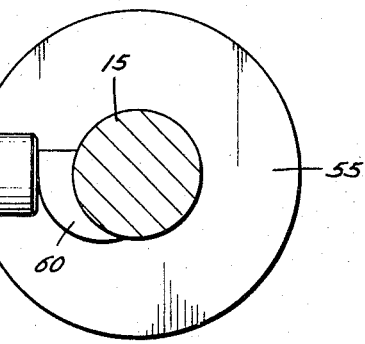
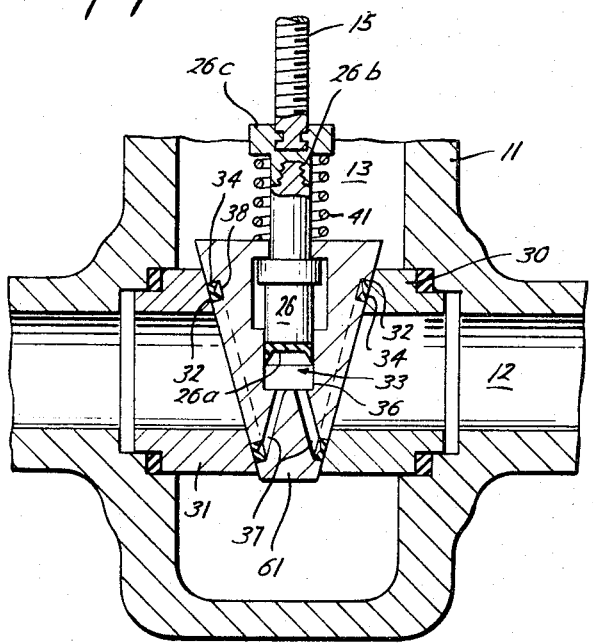
Thomas J. Bolling, Jr.
INVENTOR.
BY Hayden & Pravel
ATTORNEYS

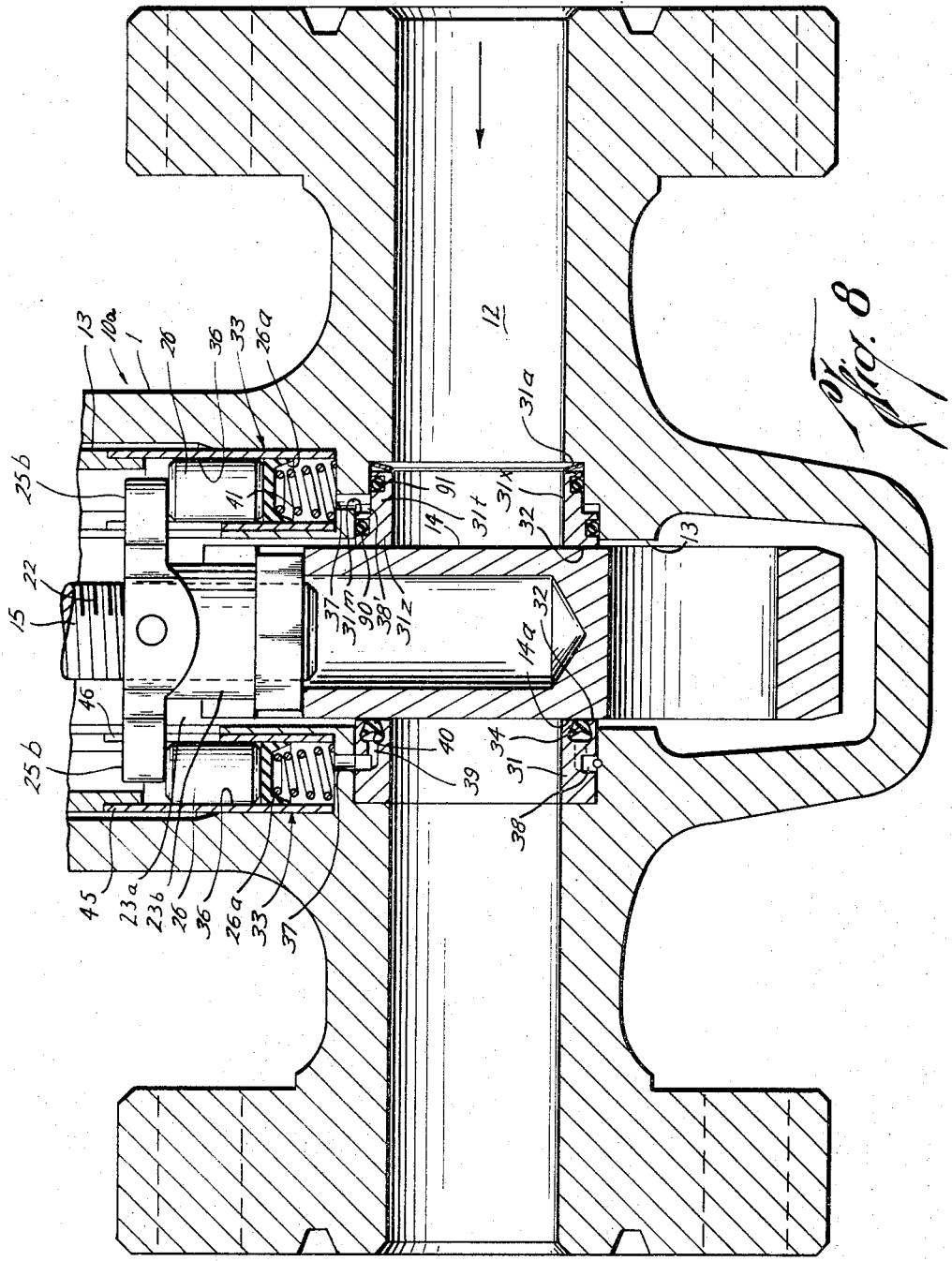

United States Patent Office 3,353,783
Patented Nov. 21, 1967

3,353,783
CLOSED FLUID SYSTEM FOR SEALING
VALVE CLOSURE ELEMENTS
Thomas J. Bolling, Jr., 5310 Glenmont,
Houston, Tex. 77036
Original application Aug. 2, 1964, Ser. No. 479,035, now Patent No. 3,321,176, dated May 23, 1967. Divided and this application Sept. 12, 1966, Ser. No. 599,656
1 Claim. (Cl. 251—172)

ABSTRACT OF THE DISCLOSURE

A closed fluid system in the valve for maintaining an effective seal on the valve closure element when it is in closed position.

---

This application is a division of an application filed Aug. 2, 1964, now Patent No. 3,321,176 granted May 23, 1967, which is in turn a continuation-in-part, of an application filed Feb. 1, 1962, bearing Ser. No. 170,433, and now abandoned.

In valve constructions presently used, a great deal of difficulty is encountered in maintaining the valve closure element sealed within the valve when seated in closed position so as to inhibit leakage of fluid around the closure element from the upstream to the downstream side.

The present invention provides an arrangement whereby a positive sealing on the valve closure element may be effected when it is in closed position but which sealing arrangement does not bind or stick the closure element even though it may remain in closed position over a substantial period of time.

The present invention is also advantageous in that it can be adapted for use with various valves such as gate valves and plug valves and other types of valves.

An important object of the present invention is to provide a closed fluid receiving system in the valve which is closed relative to the fluid flow through the valve whereby the fluid in the closed system may urge a seal means against the valve closure element when it is in closed position to inhibit leakage in the valve.

An important object of the present invention is to provide a closed fluid receiving system which is closed relative to the fluid flow through the valve whereby the fluid in the closed system may urge a seal means against the valve closure element when it is in closed position to inhibit leakage in the valve, there being means for exerting a force on the fluid in the closed system as the valve closure element is moved to closed position.

Other objects and advantages of the present invention will become more readily apparent from a consideration of the following description and drawings, wherein:

FIG. 1A is a view, partly in section, on the line 1A—1A of FIG. 1 to illustrate certain details of the invention;

FIG. 2 is an exploded view illustrating the top portion of the gate and the nut which may be connected therewith and which threadedly receives the stem of the valve;

FIG. 3 is a partial vertical sectional view of a gate valve somewhat similar to FIG. 1 but showing the gate split and the present invention arranged therein for use with the split gate;

FIG. 4 is a view, partly in section, on the line 4—4 of FIG. 3 illustrating the nut which is supported on the gate and threadedly connected on the stem whereby rotation of the stem actuates the gate and the present invention;

FIG. 5 is a sectional view, partly in elevation, showing a rotatable plug valve and the present invention used therewith;

FIG. 6 is a view on the line 6—6 of FIG. 5 partly in section to show the means on the valve stem for actuating the piston means of the present invention which creates the fluid pressure on the seal means of the present invention;

FIG. 7 shows the present invention employed on a tapered lift plug valve; and

FIG. 8 illustrates another form of the present invention.

Figure 1:
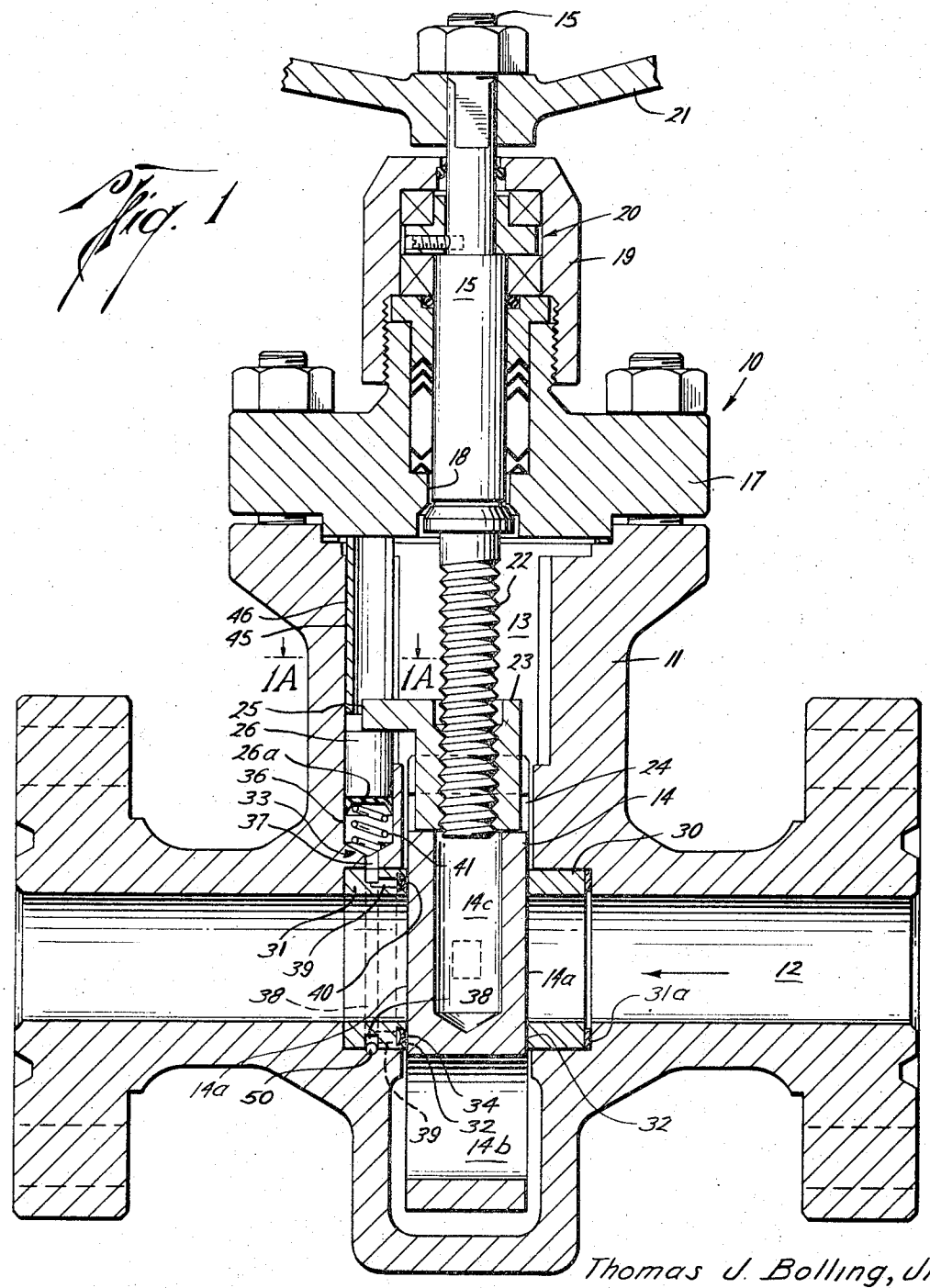
FIG. 1 is a vertical sectional view illustrating the present invention in a gate valve.

Attention is first directed to FIG. 1 of the drawings wherein a valve is indicated generally by the numeral 10. The valve body 11 is provided with a transverse bore 12 therethrough for fluid flow through the body in the direction as represented by the arrow and is provided with a lateral bore 13 which receives the gate 14 therein. The gate 14 is adapted to be moved in the lateral passage 13 by means of the valve stem 15 for opening and closing the transverse bore 12 to fluid flow through the valve body 11. The valve stem 15 extends through the lateral passage 13 and is rotatably supported in the valve 10 by means of the bonnet 17 which is secured by any suitable means on the valve body 11 and closes off one end of the lateral bore 13 as shown in FIG. 1 of the drawings.

The valve stem 15 is rotatably supported in the bonnet 17 in a manner well known in the art and extends through the bore 18 of the bonnet 17 as shown in FIG. 1. A cap 19 engages the bonnet 17 and a suitable bearing and sealing arrangement as designated at 20 in the cap 19 and in bore 18 of the bonnet 17 is provided for supporting and sealing off the stem 15 in the bonnet 17. A hand wheel 21 is connected to the outer end of the valve stem 15 by suitable means well known in the art.

The lower end of the valve stem is threaded as illustrated at 22 and threadedly engages the nut 23, which in turn is received in the slot 24 at the top of the gate 14. The relationship of the nut 23 and the slot 24 is better illustrated in FIG. 2 of the drawings wherein it can be seen that the slot or groove 24 is of an inverted T shape and the lower end of the nut 23 is conformed with the shape of the groove 24 to be slidably received therein. A projection 25 extends laterally from the nut 23 for engaging and moving the piston 26 as will be described in greater detail hereinafter.

It is to be noted that the gate 14 includes a portion 14a which blanks off or closes the transverse bore 12 when the gate is in the position shown in FIG. 1 and is provided with an opening 14b which may be aligned with the transverse bore 12 to accommodate flow through the valve body 11. A slot 14c extending longitudinally of the gate 14 receives the threaded portion 22 of the valve stem 15 as movement of the gate 14 within the lateral bore 13 is effected to open and close the transverse bore 12 to fluid flow.

As shown in the drawings, cylindrical members 30 and 31 are received within suitable counterbores in the transverse bore 12 at its intersection with the lateral bore 13 which provide a seating surface means 32 for slidably receiving the gate 14 in the lateral passage 13; however, the cylindrical members 30 and 31 may be eliminated if desired and the seating surfaces 32 for the gate 14 integrally formed on the body 11. In order to properly receive the gate 14 on the seating surfaces 32 where separate rings or cylindrical members 30 and 31 are used, a Belleville spring or other similar washer spring represented by the numeral 31a may be used. This urges the ring 30 against the gate 14 and thereby retains the gate and surfaces 32 of members 30 and 31 in sliding engagement.

Passage means designated generally by the numeral 33 are provided in the valve body 11 which communicate with the seal means 34 mounted in the seating surfaces 32 of the valve body 11. The passage means 33 is closed at one end by the piston 26 and the movable seal 26a therebelow whereby the passage means 33 between the seal 26a and the annular seal means 34 forms a closed fluid receiving system within the valve body 11 so that movement of the piston 26 to decrease the volume of the passage means 33 causes the fluid or liquid within the passage means 33 to exert a pressure on the side of the seal means 34 opposite from the side of the seal means which faces gate 14 and thereby urges the seal means into sealing engagement with the adjacent blank face 14a of the gate 14.

The passage means 33 is shown as including an enlarged portion 36 in which the piston 26 and slidable seal 26a are received. A bore 37 at the lower end thereof communicates with an annular groove 38, and a plurality of circumferentially spaced openings or passages 39 communicate the annular groove 38 with the rear face 40 of the seal means 34. The seal means 34 is seated in an annular groove formed in the seating face 32 of the member 31. A spring 41 in the enlarged portion 36 of the passage means 33 urges the piston 26 and the movable seal means 26a normally upwardly within the enlarged portion 36 as viewed in FIG. 1 of the drawings. In order to limit the upper travel of piston 26 and seal 26a, a cylindrical retainer sleeve 45 is provided which is mounted within the cylindrical passage 46 as better illustrated in FIG. 1A of the drawings. It is to be noted that the cylindrical opening 46 and the sleeve 45 received therein are slotted longitudinally to receive the projection 25 of the nut 23. Thus, when the gate 14 is moved in the lateral passage 13 so that the bore 14b is in alignment with the transverse bore 12, the nut 23 will be moved adjacent the inner end of the bonnet 17; however, the piston 26 is limited in its upward travel by reason of the lower end of the sleeve 45 which will engage the piston 26 and prevent it from ejecting from the enlarged portion 36 of passage means 33.

It can be appreciated that as the valve stem 15 is rotated to move the gate 14 to closed position, the nut 23 will move downwardly with the gate and the projection 25 engages the top of the piston 26 to thereby urge the piston 26 and the seal 26a down against spring 41 to reduce the volume within the passage means 33. This causes the viscous liquid within the passage means 33 to act on the seal means 34 to move it into positive sealing engagement with the gate 14.

It may be desirable to change the liquid within the closed fluid passage receiving system 33, and for this purpose, there is provided on the opposite side of the valve (not shown) an Alemite fitting which communicates with groove 38 by means of opening 50 in the valve body 11. The Alemite fitting is of a well-known construction, and description thereof is believed to be unnecessary for the purposes of this invention.

In FIG. 3, the present invention is shown on a valve wherein flow in the transverse bore 12 may be in either direction. The threaded end portion of the valve stem is again represented by the numeral 22 and the valve body is again represented by the numeral 11, and the transverse bore in the body is shown at 12, and the lateral bore at 13. The nut 23a of FIG. 3 assumes a slightly different configuration. As shown in FIG. 3, the nut 23a includes a tubular body 23b which is threaded internally to receive the threaded shaft 22. The tubular body 23b is integrally formed at its lower end with the square head 23c. As better shown in FIG. 4 of the drawings, two diametrical openings 23d and 23e are provided in the upper portion of the tubular body 23b. Pressed into the openings 23d and 23e are pins 23f. A collar C is provided with diametrically opposed projections 25b which are similar in function to the projection 25 described with regard to FIG. 1. The collar C is supported on the tubular body 23b by means of the pins 23f which extend into the openings 23g formed in the collar C. Thus, the collar C is pivotally supported on the tubular body 23b of the nut 23a and may skew in relationship to the tubular body 23b by reason of the clearance between the collar and the body as illustrated at 23h.

It is to be also noted that gate in FIG. 3 is slightly modified in that it is split longitudinally into portions 14' and 14", respectively. Suitable springs as illustrated at 51 are mounted within openings in each portion 14' and 14" for urging the gate portions 14' and 14" into engagement with the seating surfaces 32 formed around the transverse bore 12 in valve body 11.

It is to be noted in the FIG. 3 modification that the square head 23c of the nut 23a is received within an inverted T-shaped groove 24 which is similar to the groove described in the top of the gate and shown in FIG. 1 and FIG. 2 of the drawings.

Also, it is to be noted that the FIG. 3 modification includes a separate closed fluid receiving passage means 33 and a piston 26 whereby fluid pressure may be communicated to the seal 34 in engagement with the blank surface 14a of each gate portion 14' and 14". It will be further noted that a piston 26 is provided in an enlarged portion 36 of each of the passage means 33 and that an annular groove 38 is provided on each side of the lateral passage as well as the openings 39 which communicate the annular groove 38 with the back of the seal ring 34.

In the FIG. 3 form, a seal means 34 is provided in an annular groove of each ring 30 and 31.

The function of the invention shown in FIG. 3 is similar to that described with regard to FIG. 1; however, it is to be noted that the arrangement of the collar C and the nut 23a as described and shown in FIG. 4 enables the collar C to cant or skew relative to the valve stem as the gate 14 is moved to closed position if the fluid pressure in either of the fluid passage means 33 varies. Thus, if the fluid pressure in one of the fluid passage means becomes greater than the fluid pressure existing in the other closed fluid receiving system, the collar C will tilt or skew to equalize the pressure exerted in each passage means 33 on the seal means 34.

In FIG. 5, the present invention is illustrated as being adapted for use with a rotating plug valve wherein the valve body is again illustrated by the numeral 11 with the transverse bore being designated at 12 and the lateral passage at 13. The rotatable plug 55 is provided with passage means 56 which when rotated so as to communicate with the transverse bore 12 permits fluid flow through the valve body 11. The valve stem 15 is connected through the valve bonnet (not shown) to a hand wheel (not shown) or to other suitable actuating mechanism whereby the plug 55 may be rotated to either open or close the valve body 11 to fluid flow therethrough. In the form of the invention shown in FIG. 5 of the drawings, it is to be noted that the passage means 33 in the body 11 which forms the closed fluid receiving system again includes an enlarged portion 36 in which is received the piston 26 and seal means 26a. An annular groove 38 is provided in body 11 which also forms the groove for receiving the seal means 34 for sealably engaging the plug 55 when it is in closed position.

It is to be noted that the enlarged portion 36 of the passage means 33 is constructed so that the piston 26 and movable seal 26a moves in the direction parallel to the transverse bore 12, whereas in the previously described modifications, the piston 26 moves vertically relative to the bore 12. As more clearly illustrated in FIG. 6 of the drawings, the valve stem 15 is provided with an eccentric 60 which is adapted to engage the piston 26 and urge it into the fluid passage means 33 as the valve stem 15 is rotated in a counterclockwise direction as viewed in FIG. 6 of the drawings to move the plug 55 to closed position. This decreases the volume in the closed fluid receiving system and thereby exerts a pressure on the seal means 34 to urge it against the closure element or plug 55.

In FIG. 7 of the drawings, the present invention is shown as being used with a tapered lift plug valve, the body being illustrated by the numeral 11, the lateral bore by the numeral 13, and the transverse bore by 12. The valve stem 15 is supported in a bonnet in a suitable manner so that as it is rotated, the tapered lift plug 61 may be moved in the lateral passage to open the transverse bore 12 to fluid flow through the body 11. The manner of support of the stem 15 in the bonnet and the construction of the bonnet may be of any suitable well-known form and is not material to the present invention.

The cylindrical portions 30 and 31 may be separate or may be eliminated and the seating surfaces 32 integrally formed with the body 11. It is to be noted that their seating faces 32 are spaced and inclined so as to receive the tapered lift plug 61 in engagement therewith when the plug 61 is lowered to close off flow through the transverse bore 12. In operation of the invention shown in FIG. 7, when the valve stem 15 has lowered the plug 61 onto the surfaces 32, continued rotation of the stem 15 causes the piston 26 to move down in the enlarged bore 36 of the fluid passage means 33 whereby fluid is conducted through the two bores 37 in the plug to the annular groove 38 on each side of the tapered plug in which groove there is received the seal ring 34. In the form of the invention illustrated in FIG. 7, it is to be noted that the piston 26 and the connection with the valve stem 15 are integrally formed. The shaft 26b that is connected to piston 26 extends up through the opening or slot in the plug 61 and terminates in the enlargement 26c in which enlargement the stem 15 is rotatably, nonlongitudinally movably, connected. The shaft 26b may be formed of sections, if desired, to facilitate assembly and mounting. A spring 41 rests on the top of the plug 61 and abuts the lower end of the enlargement 26c so that as the lift plug 61 is moved away from the surfaces 32, the piston 26 is urged back to its normal position in the fluid passage means, thereby first relieving the fluid pressure acting on the seals 34 before a lifting effort is applied on the plug. As shown in FIG. 7, the present invention is contained within the plug 61.

From the foregoing description, it can be appreciated that the present invention provides a positive means for urging a seal between a valve closure element and a valve body when the valve closure element is in closed position therein. However, the invention is constructed and arranged so that as the valve closure element is moved to open fluid flow in the valve body, the pressure acting on the seal means is relieved, thereby tending to inhibit galling or binding of the valve closure element even though it may remain in closed position in the valve body over an extended period of time. These functions are accomplished by a closed fluid receiving system which functions independently of the fluid pressure which may exist in the valve by reason of fluid flow therethrough.

The fluid in closed system formed by passage means 33 may be any suitable viscous liquid or plastic flowing means which will act to exert a pressure on seal means 34 when the piston 26 is moved into the fluid passage means 33 and which fluid will flow or move away from seal means 34 in response to movement of the piston 26 as the closure element is opened.

As noted from the foregoing description and drawings, the present invention may assume any of several forms. For example, the closed liquid receiving system may be formed and contained within the valve body or the valve closure element as shown, or it may be contained separate or externally of the valve body and closure element. In the latter event, the function of the invention would be the same, and as the valve closure element is moved to closed position, the liquid from the external source would be conducted to act on the seal means and seal it against the valve closure element. In all forms, the liquid receiving system is closed relative to fluids flowing through the valve body.

A spring 41 is provided in each valve illustrated for aiding in relieving the pressure on seal means 34 when the valve closure element is opened.

FIG. 8 shows the present invention in a slightly modified form. The valve 10a is a one-way valve similar to valve 10 of FIG. 1 since the valve is constructed for flow in only one direction as represented by the arrow. The valve body 11 is provided with the transverse bore 12 and lateral bore 13 similar to the valve of FIG. 1. The gate 14 of the valve is positioned in the bore 13 and moves to open and close the bore 12 in the valve body to fluid flow. The threaded lower end 22 of the valve stem 15 receives a nut 23a similar in construction to the nut 23a of the FIG. 3 modification. The nut 23a has projections 25b which engage pistons 26. Each piston 26 and seal 26a is seated in an enlarged portion 36 of each of the passage means 33 formed in valve body 11 on each side of gate 14. The passage means 33 includes the enlarged portion 36, the bore 37 at the lower end of each enlarged portion 36, and the annular groove 38 and circumferentially spaced openings or passages 39 which communicate the annular groove 38 with the rear face 40 of the seal means 34 on one side of the gate and the passage means 33 on the other side of the gate includes the enlarged portion 36, the bore 37 at the lower end thereof, and the annular groove 38' on the right hand side of the gate 14 as viewed in FIG. 8 of the drawings.

The cylindrical members 31 and 31x are received within suitable counterbores in the transverse bore 12 at its intersection with lateral bore 13 and provide a seating surface 32 in the valve body 11 for slidably receiving gate 14. The member 31 is similar in construction to the member 31 of the FIGS. 1 and 3 form, and the member 31x is arranged on the other side of gate 14 and its construction will be pointed out in detail. A Belleville spring 31a is provided for urging member 31x into engagement with gate 14 as will be described in greater detail hereinafter.

The cylindrical member 31x includes the larger diameter portion 31z and the smaller diameter portion 31t, thereby forming a shoulder 31m. The reduced diameter portion 31t fits into a smaller counterbore in lateral bore 12 as shown in FIG. 8, and the Belleville spring abuts the end of the reduced extension 31t. Suitable seal means such as O-rings 90 and 91 are provided on the portions 31z and 31t, respectively, which span the bore 37 of the fluid passage means 33 regardless of the longitudinal position of the member 31x. The gate 14 of the FIG. 8 modification is moved by valve stem 15 in a manner similar to that described with regard to FIGS. 1 and 3.

The fluid receiving system or fluid passage means 33 on each side of gate 14 is closed relative to fluid flow through the valve body 11, and as the stem 15 moves the gate 14 to closed position, projections 25b move pistons 26 downwardly in enlarged portions 36. This forces the pressure fluid out through the bores 37.

The effective area of the member 31x responsive to the pressure fluid in passage means 33 as piston 26 moves downwardly is such that the pressure fluid in the passage means 33 will first act on shoulder 31m and the seal ring 90 to move 31x against gate 14 before the fluid pressure is effective on seal ring 34 to urge it to engage against the blank face 14a of the gate 14 to seal off thereagainst.

This moves the gate 14 and positions it properly in bore 13 so as to receive the seal ring 34 thereagainst and prevents the extrusion of seal ring 34 between the gate 14 and body 11 by the pressure fluid acting in passage means 33 and also thereby assures a positive seal as well as inhibiting cutting out of the seal means 34.

The pressure in bore 12 may act on member 31x to aid in initially moving it out against gate 14 before the pressure fluid is effective to urge the seal means 34 outwardly into engagement with gate 14, and the Belleville spring 31a will also aid in this regard.

The seals 90 and 91 prevent commingling of the fluid flowing through the valve body with the pressure fluid in the passage means 33 on the right hand side of the gate 14.

The annular groove 38' is defined by shoulder 31m; the inner end of the larger counterbore in the body 11; the annular surface on the reduced diameter portion 31t between 31m and the inner end of the larger counterbore; and the annular surface on the larger counterbore between 31m and the end of the larger counterbore. Thus, groove 38' may vary in length depending upon the position of the member 31x.

The projections 25b move in slotted cylindrical opening 46 which is provided with a sleeve 45 for the purposes and as described with regard to FIGS. 1A and 4. A spring 41 is provided to urge the pistons 26 upwardly in enlargement 36 when the valve stem is rotated to open gate 14 for flow through the body 11.

Broadly, the present invention relates to a seal means for a valve and more particularly, to a closed fluid system for a valve whereby pressure may be urged on a seal means independently of other pressures existing within the valve body.

What is claimed is:

In a valve including a body having a transverse bore for fluid flow therethrough and having a lateral bore intersecting the transverse bore for receiving a slidably moving gate element for closing and opening the transverse bore to fluid flow and a movable stem extending into the body and connected to the element for closing and opening the transverse bore to fluid flow on movement of the element in the lateral bore, the improvement comprising:
  (a) resilient seal means carried by the valve body on one side of the gate element;
  (b) a groove formed between the valve body and element and extending around the transverse bore for receiving said resilient seal means;
  (c) said resilient seal means substantially filling the groove and movable relative to the groove to seal between the valve body and element;
  (d) fluid passage means formed in the valve for communicating only with one side of said seal means;
  (e) piston means received in one end of said fluid passage means to close off same and form a closed fluid receiving and retaining system in the valve between said piston and seal means and closing said fluid receiving and retaining system relative to said lateral and transverse bores, said system receiving and retaining fluid therein for movement by said piston means to urge said seal means to sealingly engage between the element and valve body when in closed position;
  (f) means carried on the stem for actuating and moving said piston means on moving the element in the lateral bore toward a closed position, whereupon said piston means urges the fluid through said passage means to act only on said seal means and move only said seal means relative to said groove into sealing engagement between the valve body and element;
  (g) spring means in said closed fluid receiving and retaining means and acting on said piston means to normally move it in said closed fluid system so as not to force fluid against said seal means, but yieldable when said means on the stem engages said piston to enable said piston means to move fluid against the fluid in said closed system and urge said seal means into sealing position, and said spring urging said piston means in an opposite direction when said means on the stem disengages said piston to relieve the fluid pressure in said closed system acting on said seal means to release it from sealing engagement with the element; and
  (h) a cylindrical member mounted in the valve and surrounding the transverse bore with spring means acting thereon to urge said cylindrical member into engagement with the side of the element opposite that with which said seal means engages.

References Cited

UNITED STATES PATENTS

| | | | |
|---|---|---|---|
| 2,229,871 | 1/1941 | Penick | 251—200 |
| 2,567,032 | 9/1951 | Schmidt | 251—160 X |
| 2,660,397 | 11/1953 | Volpin | 137—246.12 |
| 2,726,842 | 12/1955 | Seamark | 251—172 |
| 2,746,712 | 5/1956 | Wickman | 251—161 X |
| 2,865,597 | 12/1958 | Lucas | 251—187 |
| 3,034,760 | 5/1963 | Henrion | 251—173 |
| 3,095,004 | 6/1963 | Jackson | 251—172 X |

CLARENCE R. GORDON, *Primary Examiner.*